United States Patent Office 3,623,305
Patented Nov. 30, 1971

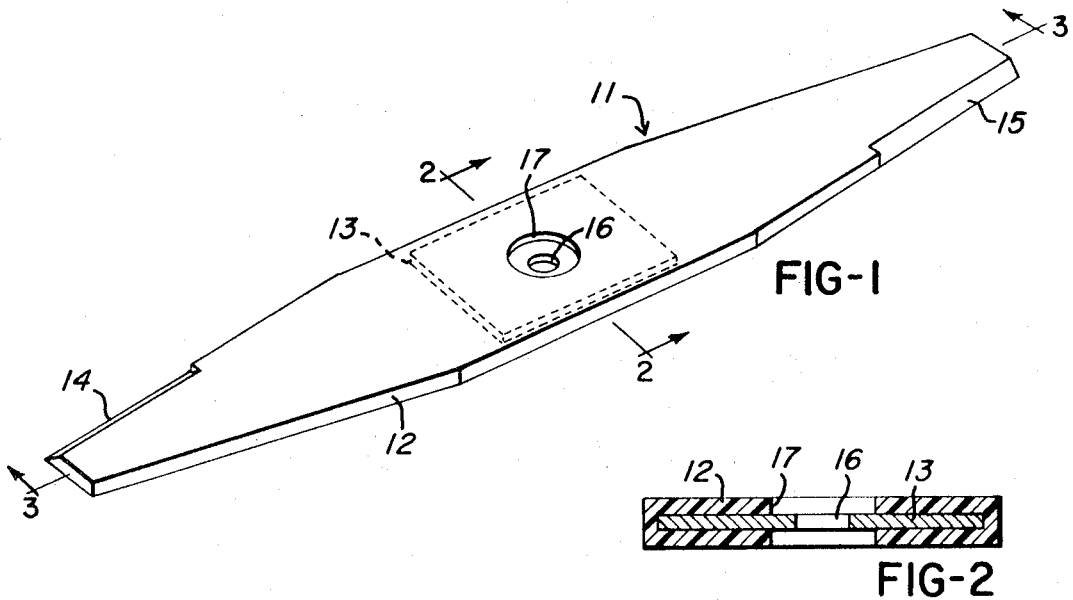
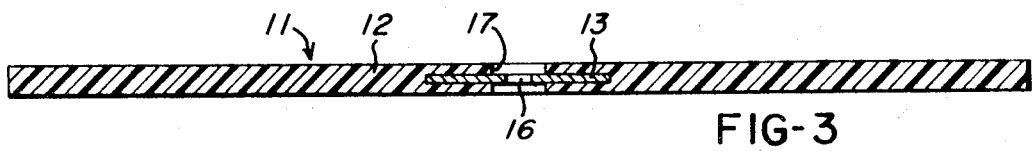
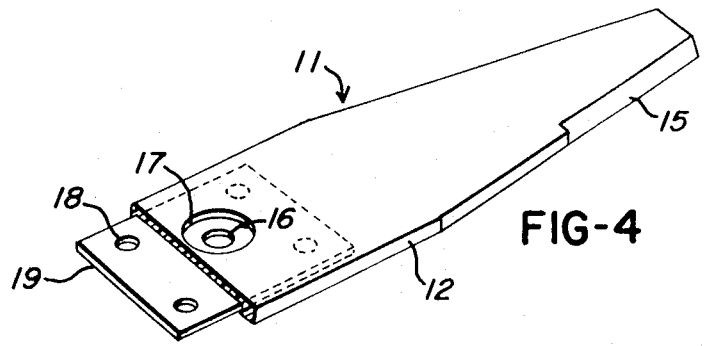
INVENTORS
ABRAHAM L. FREEDLANDER
ROBERT E. MATTHEWS
WAYNE C. GARRETT

3,623,305
MOWER BLADE
Abraham L. Freedlander, Dayton, Ohio, and Robert E. Matthews and Wayne C. Garrett, Waynesville, N.C., assignors to Dayco Corporation, Dayton, Ohio
Continuation of application Ser. No. 759,825, Sept. 11, 1968, which is a continuation of application Ser. No. 625,802, Mar. 24, 1967. This application Apr. 8, 1969, Ser. No. 816,166
The portion of the term of the patent subsequent to Dec. 23, 1986, has been disclaimed
Int. Cl. A01d 55/18
U.S. Cl. 56—295
1 Claim

ABSTRACT OF THE DISCLOSURE

A flexible mower blade adaptable for mounting on a power driven rotary lawn mower and designed for safety which results from the inherent flexibility of the blade. The blade is primarily formed of an elastomeric material such as urethane but has a rigid metal or plastic central mounting portion bonded within the blade for mounting to the lawn mower shaft.

---

This application is a continuation of United States application Ser. No. 759,825, filed Sept. 11, 1968, which in turn was a continuation of United States application Ser. No. 625,802, filed Mar. 24, 1967; both abandoned.

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our copending application Ser. No. 579,304, filed Sept. 14, 1966, now U.S. Pat. No. 3,343,350, we have described a blade made entirely of a urethane elastomer. The present application represents an improvement over our earlier application in that it provides a central rigid mounting portion embedded within the elastomer for mounting the blade upon the drive shaft. The use of this integral mounting plate eliminates separate mounting members which are usually required with lawn mowers and has several advantages. First of all, it eliminates the possibility of the separate members becoming lost. Second, it eliminates the sharp exposed metal edges which are found in conventional adapters, thus minimizing the possibility of injury. Third, the thickness may be varied to equal that of the metal blade, thus providing simple installation with no additional hardware. Further, by embedding this metal within the body of the elastomer it minimizes the possibility that the metal adapters will rust when exposed to moisture or air and also makes feasible the use of cheaper steel than is presently required. An additional advantage of this novel blade is the fact that it may be built up in size in selected portions in order to provide additional metal for the flywheel adapter which is required in lawn mower blades.

The specific embodiments of the invention are described in the following specification and claims, and illustrated in the drawings, in which:

FIG. 1 is a perspective view of a novel blade.

FIGS. 2 and 3 are cross-sectional views of the blade taken along lines 2—2 and 3—3 of FIG. 1.

FIG. 4 is a view similar to FIG. 1 illustrating a broken portion of a modified form of the blade.

Referring to the drawings, FIG. 1 illustrates a lawn mower blade 11 which is generally flat and rectangular and formed of the body 12 having cutting edges 14 and 15 at the extremities thereof. This body is made of a urethane elastomer such as more fully described in our copending application referred to above, and is preferably of the type which may be molded or cast and formulated from a polyester or polyether based isocyanate terminated prepolymer. Mounted within the central portion of the blade is a rigid web 13 which may be made of a metal or of a rigid plastic material such as nylon, polycarbonate, polystyrene, or the like. As shown in FIGS. 1–3 this web 13 is completely embedded within the blade and forms a central mounting member. An aperture 16 in the center of the web permits mounting on the shaft of a lawn mower, and larger apertures 17 in the body material located concentrically of the aperture 16 permit the use of the appropriate hardware for mounting. The aperture 16 may be made with a diameter which is required to fit the smallest of the lawn mowers on the market, so that it is only necessary for the user to drill this hole out to a large diameter if required for his particular mower. The web which is illustrated provides a solid mounting member on the blade and at the same time provides stiffness in the central portion of the blade. By limiting the length of this web, however, the inherent flexibility of the blade itself is not impaired.

FIG. 4 illustrates a modified form of the novel blade in which a web 19 is utilized in a manner similar to the web 13, except that it contains a number of holes 18 as illustrated. The purpose of these holes is to permit the elastomer to flow through from both sides and provide an improved bond of the web into the body of the blade. These holes may be circular as shown, elliptical, or any other convenient shape.

It should be understood that the principle of using an embedded central web is not limited to the blade as illustrated, but may also be used with blades having three, four, or more arms, and may also be used with blades having modified shapes instead of being flat. Whichever form of the invention is utilized the main principle to be followed is that of providing a rigid central mounting portion within the flexible body.

It should also be understood that the central mounting portion 13 or 19 may be of sufficient thickness, density, or configuration to provide the necessary weight required for proper flywheel effect in the blade. This could also be done by driving rivets through the blade and plate, if desired.

Other modifications are specifically contemplated as being within the scope of this invention.

We claim:

1. In a lawn mower having a rotatable shaft and a cutting blade mounted thereon, said blade including outwardly extending arms having integral cutting edges at the outer ends only thereof for cutting grass and the like, said edges being composed of a flexible elastomer, and a rigid central mounting plate extending outwardly into said arms and terminating radially inward of the entire effective extent of said cutting edges, said outer ends being flexible with respect to said plate, said plate being at least partially embedded between the upper and lower surfaces of said arms.

References Cited

UNITED STATES PATENTS

| 3,302,377 | 2/1967 | Ely | 56—295 |
| 3,340,682 | 9/1967 | Ely | 56—295 |
| 3,343,350 | 9/1967 | Freedlander et al. | 56—295 |
| 3,398,517 | 8/1968 | Freedlander et al. | 56—295 |
| 3,465,508 | 9/1969 | Edwards | 56—295 |

LOUIS G. MANCENE, Primary Examiner

J. A. OLIFF, Assistant Examiner